(12) United States Patent
Boland

(10) Patent No.: US 9,896,064 B2
(45) Date of Patent: Feb. 20, 2018

(54) WINDSCREEN WIPER ARM

(75) Inventor: Xavier Boland, Arlon (BE)

(73) Assignee: Federal-Mogul S.A., Aubange (BE)

( * ) Notice: Subject to any disclaimer, the term of this patent is extended or adjusted under 35 U.S.C. 154(b) by 175 days.

(21) Appl. No.: 14/365,804

(22) PCT Filed: Dec. 14, 2011

(86) PCT No.: PCT/EP2011/072772
§ 371 (c)(1),
(2), (4) Date: Oct. 16, 2014

(87) PCT Pub. No.: WO2013/087102
PCT Pub. Date: Jun. 20, 2013

(65) Prior Publication Data
US 2015/0026912 A1    Jan. 29, 2015

(51) Int. Cl.
*B60S 1/34*         (2006.01)
(52) U.S. Cl.
CPC ............. *B60S 1/3429* (2013.01); *B60S 1/345* (2013.01); *B60S 1/3436* (2013.01); *B60S 1/3438* (2013.01); *B60S 1/3443* (2013.01); *B60S 1/3459* (2013.01); *B60S 1/3431* (2013.01); *Y10T 29/4984* (2015.01)
(58) Field of Classification Search
CPC .... B60S 1/3436; B60S 1/3438; B60S 1/3431; B60S 1/345; B60S 1/3434
USPC ...................................... 15/250.351, 250.352
See application file for complete search history.

(56) References Cited

U.S. PATENT DOCUMENTS

| | | | | |
|---|---|---|---|---|
| 3,061,866 A | * | 11/1962 | Krohm ..................... | B60S 1/34 15/250.352 |
| 3,099,030 A | * | 7/1963 | Zury ........................ | B60S 1/34 15/250.352 |
| 3,188,679 A | * | 6/1965 | Wubbe ..................... | B60S 1/34 15/250.352 |
| 3,265,415 A | | 8/1966 | Wubbe | |

(Continued)

FOREIGN PATENT DOCUMENTS

DE           3515329 A1  *  12/1985
DE          10335853 A1      3/2005
(Continued)

OTHER PUBLICATIONS

Machine language translation of description portion of JP 2001-180448, published Jul. 2001.*

*Primary Examiner* — Gary Graham
(74) *Attorney, Agent, or Firm* — Robert L. Stearns; Dickinson Wright, PLLC

(57) ABSTRACT

A windscreen wiper arm, particularly for automobiles, includes a mounting head mountable on a drive shaft and an arm member pivotally connected to the mounting head by means of a pivot pin. The arm member has a substantially U-shaped cross-section near the pivot pin comprising two side walls. A part of the mounting head extends between the side walls and beyond the pivot pin. The part is provided with opposite surfaces each facing towards a respective side wall of the arm member. Each surface of the part of the mounting head is positioned spaced-apart from its respective side wall of the arm member, so as to allow paint to enter a space defined between each surface of the part of the mounting head and its respective side wall of the arm member.

11 Claims, 4 Drawing Sheets

(56) References Cited

U.S. PATENT DOCUMENTS

| | | | | |
|---|---|---|---|---|
| 3,748,685 | A | * | 7/1973 | Edele .................. B60S 1/34 15/250.352 |
| 3,760,452 | A | * | 9/1973 | Edele .................. B60S 1/34 15/250.352 |
| 4,932,097 | A | | 6/1990 | Kobayashi et al. |
| 5,319,851 | A | * | 6/1994 | Ikezawa ............ B60S 1/0408 15/250.31 |
| 5,385,422 | A | * | 1/1995 | Kruger ................ F16C 11/04 29/898.055 |
| 8,176,594 | B2 | * | 5/2012 | Kim .................... B60S 1/38 15/250.201 |
| 2004/0037631 | A1 | * | 2/2004 | Vermeulen ......... B60S 1/3438 403/315 |
| 2006/0254018 | A1 | * | 11/2006 | Losch .................. B60S 1/32 15/250.351 |

FOREIGN PATENT DOCUMENTS

| | | | |
|---|---|---|---|
| DE | 10348773 | A1 | 5/2005 |
| EP | 0466425 | A2 | 1/1992 |
| EP | 0755 833 | | 1/1997 |
| JP | 2001 180448 | A | 7/2001 |
| JP | 2003182529 | A | 7/2003 |

* cited by examiner

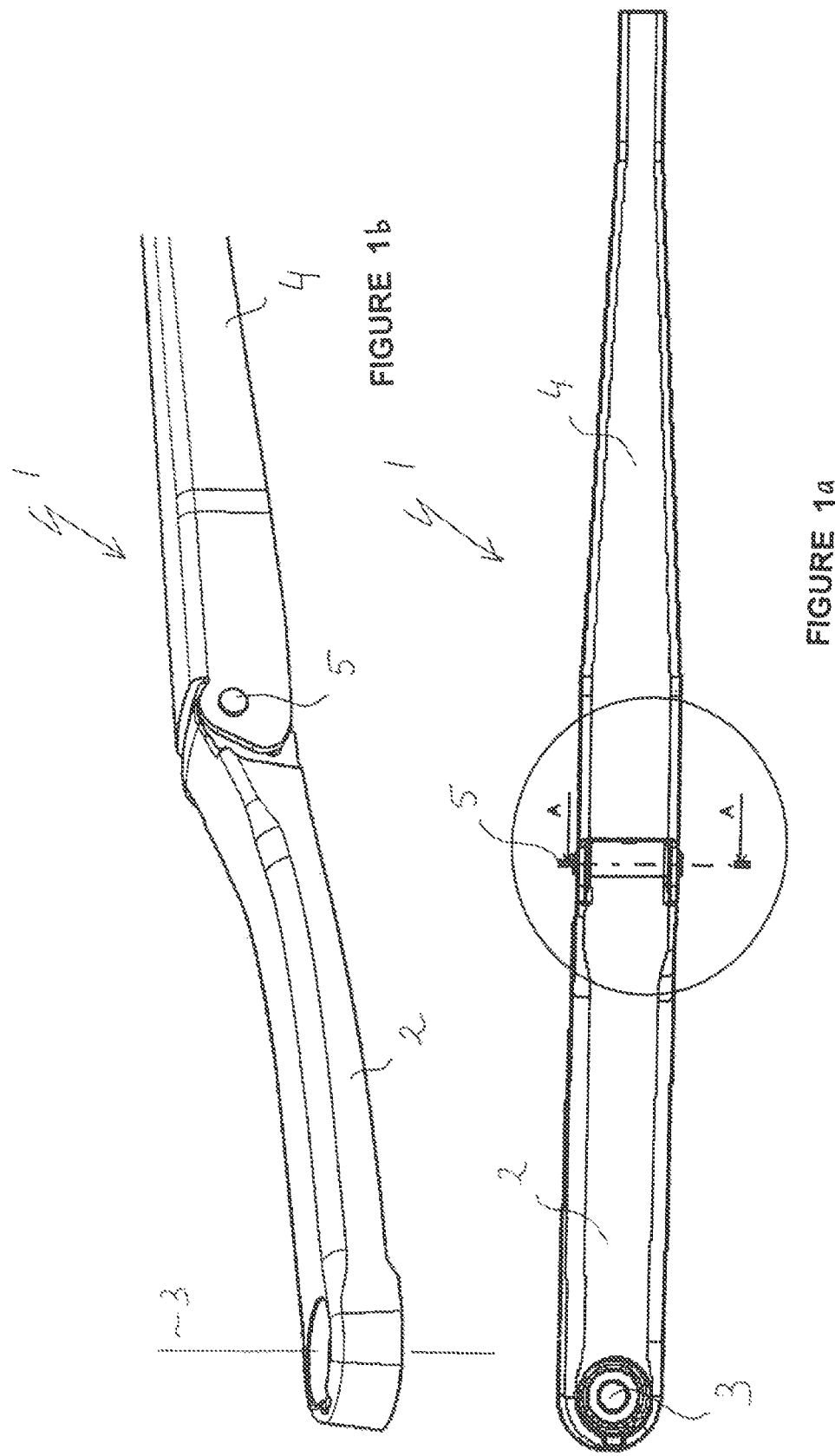

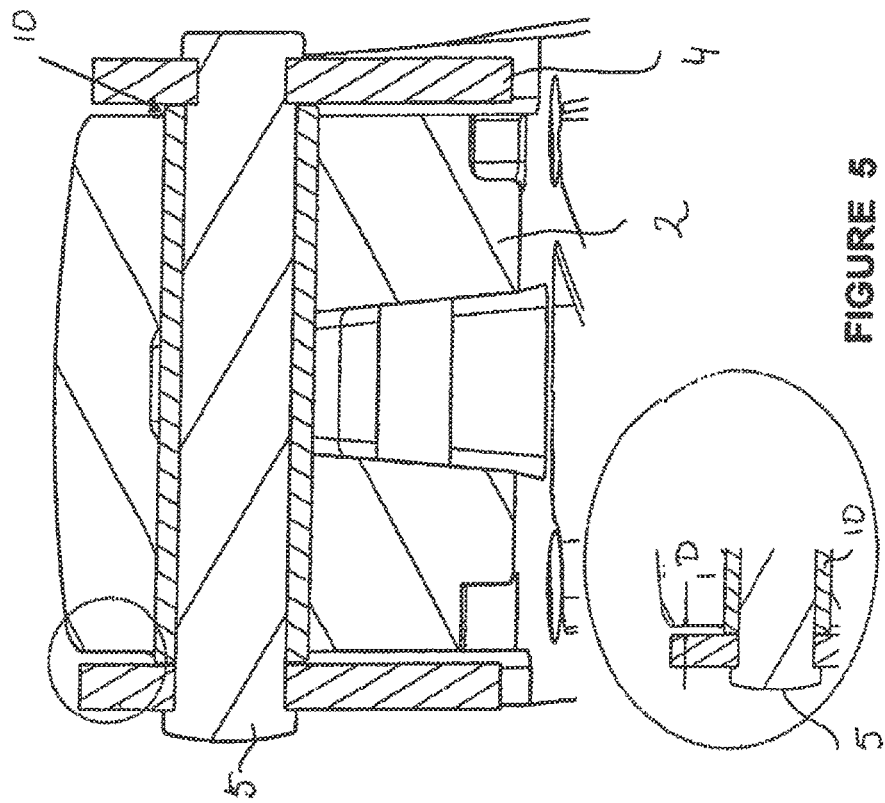
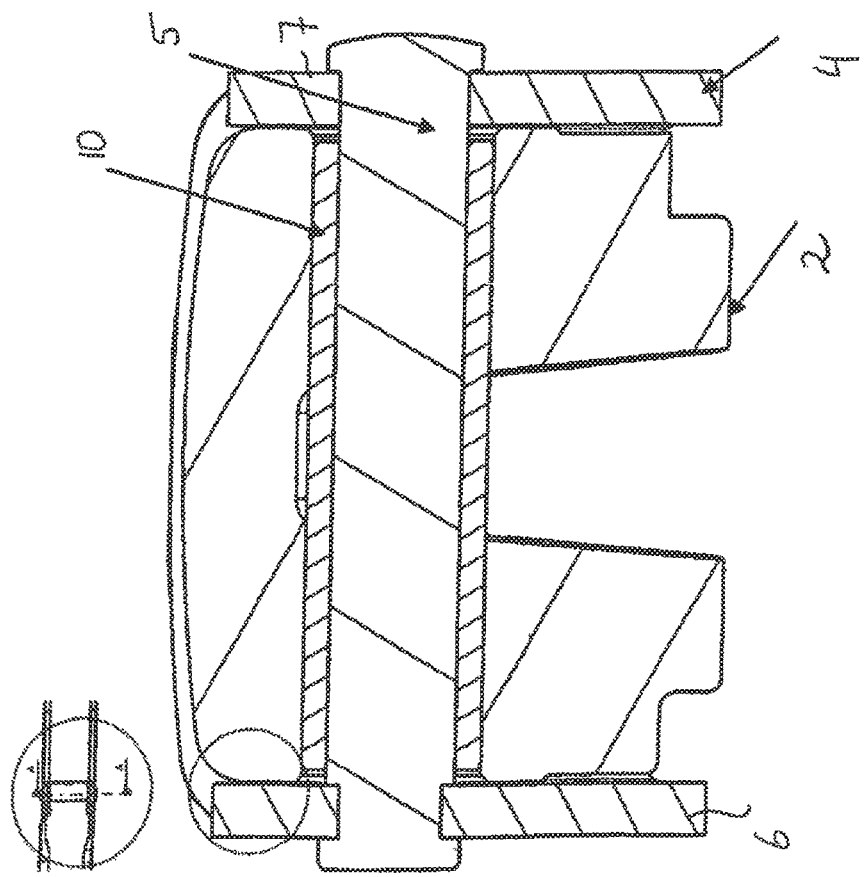
FIGURE 5
FIGURE 4
PRIOR ART

WINDSCREEN WIPER ARM

BACKGROUND OF THE INVENTION

1. Technical Field

The present invention relates to a windscreen wiper arm, particularly for automobiles, comprising a mounting head mountable on a drive shaft and an arm member pivotally connected to the mounting head by means of a pivot pin, wherein the arm member has a substantially U-shaped cross-section near the pivot pin comprising two side walls, wherein a part of the mounting head extends between the side walls and beyond the pivot pin, and wherein the part is provided with opposite surfaces each facing towards a respective side wall of the arm member.

2. Related Art

Such a windscreen wiper arm is known from European patent publication no. 0 755 833 (Valeo Systemes d'Essuyage). In this European patent document the opposite surfaces of the part of the mounting head abut against the sidewalls of the arm member. The mounting head and the arm member are equipped with complementary stop surfaces cooperating together in order to limit a pivot angle of the windscreen wiper arm.

A disadvantage of the windscreen wiper arm known from the above European patent publication is that in practice it has become apparent that the mounting head and the arm member are sensitive to corrosion, particularly at the location of their interconnection. The corrosion may lead to blockage of any pivotal movement of the arm member relative to the mounting head, as well as to a flow of corrosion from the location of their interconnection to the outside.

SUMMARY OF THE INVENTION

It is an object of the invention to obviate this disadvantage, in the sense that at minimum costs—without using complex machinery and additional tools—a windscreen wiper arm is proposed not being sensitive to corrosion.

It is noted that the present invention is not restricted to cars, but also refers to rail coaches and other (fast) vehicles.

Thereto, according to the invention a windshield wiper arm mentioned in the preamble is characterized in that each surface of the part of the mounting head is positioned spaced-apart from its respective side wall of the arm member, so as to allow paint to enter a space defined between each surface of the part of the mounting head and its respective side wall of the arm member. Particularly, the distance between the one surface of the part of the mounting head and its respective side wall of the arm member equals the distance between the other surface of the part of the mounting head and its respective side wall of the arm member. Due to the fact that the surfaces of the part of the mounting head on the one hand and the sidewalls of the arm member on the other hand are spaced apart, i.e. located at a distance from each other, in assembled position of the mounting head and the arm member paint is allowed to flow between the surfaces of the mounting head and the sidewalls of the arm member. Hence, the mounting head and the arm member are entirely covered by paint, also at the location of their interconnection, so that corrosion is avoided at all times.

In a preferred embodiment of a windscreen wiper arm in accordance with the invention the distance between each surface of the part of the mounting head and its respective side wall of the arm member is lying within a range between 0.1 mm and 2 mm, preferably between 0.1 mm and 1 mm. Accordingly, all kind of paints with mutually differing viscosity may enter the space between each surface of the part of the mounting head and its respective side wall of the arm member.

In another preferred embodiment of a windscreen wiper arm according to the invention the pivot pin extends through the side walls of the arm member and through a transverse bush of the mounting head, wherein the transverse bush extends through the surfaces of the part of the mounting head. Particularly, the transverse bush functioning as a guiding sleeve for the pivot pin is stamped through the surfaces of the part of the mounting head. A stamping operation in this framework is a very reliable and controllable operation.

In a preferred embodiment of a windscreen wiper arm in accordance with the invention the length of the transverse bush is larger than the width of the mounting head at the location of the transverse bush, so as to allow paint to enter the space between each surface of the part of the mounting head and its respective side wall of the arm member.

In another preferred embodiment of a windscreen wiper arm according to the invention the length of the transverse bush is slightly smaller than the width of the arm member at the location of the transverse bush, so as to limit lateral play of the mounting head relative to the arm member.

In another preferred embodiment of a windscreen wiper arm in accordance with the invention a partly open ring is provided around the transverse bush on the outside of each surface of the part of the mounting head, so as to allow paint to enter the space defined between each surface of the part of the mounting head and its respective side wall of the arm member. Preferably, the partly open ring is formed by a part of a ring wherein the part has a closed circumference. In an alternative preferred embodiment the partly open ring is formed by a complete ring having interruptions in its circumference. In both cases the partly open ring or the entire ring having interruptions are part of the mounting head.

In another preferred embodiment of a windscreen wiper arm according to the invention the pivot pin is a rivet, while the arm member is preferably made of a plastic material.

The present invention also refers to a mounting head and/or an arm member as defined in a windscreen wiper arm in accordance with the invention.

Further, the present invention also relates to a windscreen wiper device of the "flat blade" type connected to a windscreen wiper arm according to the invention. Preferably, the windscreen wiper device comprises an elastic, elongated carrier element, as well as an elongated wiper blade of a flexible material, which can be placed in abutment with a windscreen to be wiped, which wiper blade includes at least one longitudinal groove, in which groove a longitudinal strip of the carrier element is disposed, which windscreen wiper device comprises a connecting device for the windscreen wiper arm according to the invention.

Finally, the present invention is directed to a method for manufacturing a windscreen wiper arm, particularly for automobiles, comprising a mounting head mountable on a drive shaft and an arm member pivotally connected to the mounting head by means of a pivot pin, wherein the arm member has a substantially U-shaped cross-section near the pivot pin comprising two side walls, wherein a part of the mounting head extends between the side walls and beyond the pivot pin, and wherein the part is provided with opposite surfaces each facing towards a respective side wall of the arm member, characterized in that each surface of the part of the mounting head is positioned spaced-apart from its respective side wall of the arm member, so as to allow paint to enter a space defined between each surface of the part of the mounting head and its respective side wall of the arm member.

THE DRAWINGS

The invention will now be explained in more detail with reference to figures illustrated in a drawing, wherein:

FIG. 1 is a perspective, schematic view (FIG. 1a), as well as a bottom view (FIG. 1b) of a preferred embodiment of a windscreen wiper arm according to the invention (without a windscreen wiper blade);

Figure 3:
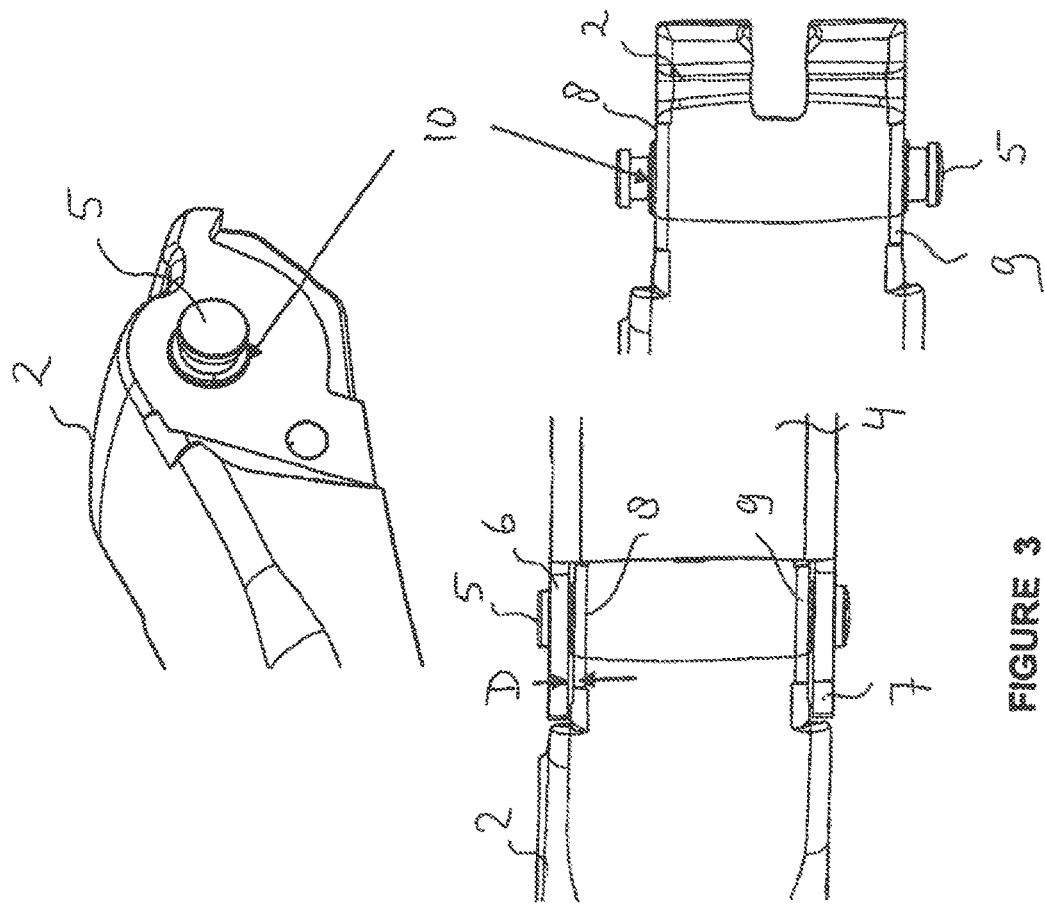
FIGS. 2 and 3 show a perspective, schematic view, as well as a bottom view of a mounting head according to the prior art (FIG. 2) and according to a first embodiment of the present invention (FIG. 3), as used in the windscreen wiper arm of FIG. 1.
Figure 7:
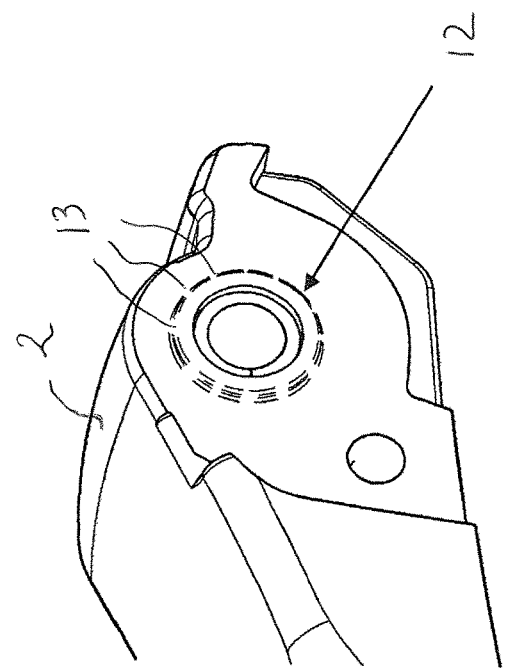
Figure 6:
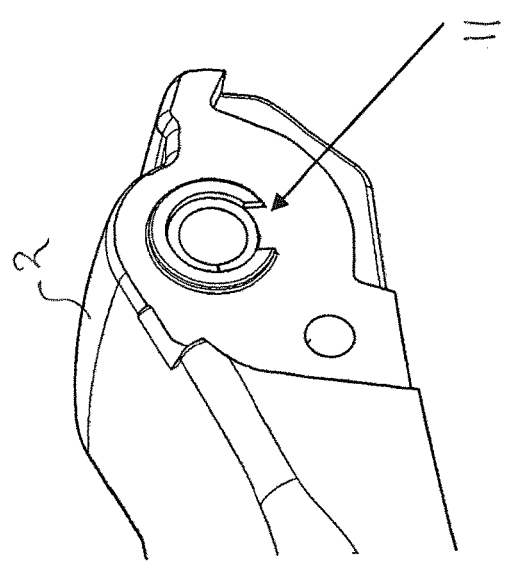

FIGS. 4 and 5 are cross-sectional views along the line A-A in FIG. 1 of the interconnection according to the prior art (FIG. 4) and according to the first embodiment of the present invention (FIG. 5) between the mounting heads of FIGS. 3 and 4, respectively, and an arm member, as used in the windscreen wiper arm of FIG. 1; and FIGS. 6 and 7 are a perspective, schematic view of a mounting head according to a second preferred embodiment (FIG. 6) and a third preferred embodiment according to the present invention, respectively.

DETAILED DESCRIPTION OF EMBODIMENTS

FIGS. 1 through 4 show a first preferred variant of a windscreen wiper arm 1 according to the invention. As illustrated in FIG. 1, the windscreen wiper arm 1 according to the invention comprises a metal mounting head 2 which can be fixed for rotation to a shaft 3 driven, via a mechanism not illustrated, by a small motor. the windscreen wiper arm 1 further comprises a metal arm member 4 supported by the mounting head 2, wherein the arm member 4 in turn supports a wiper blade (not shown) with the help of a connecting device (not shown). The arm member 4 is pivotally connected to the mounting head 2 by means of a pivot pin 5 in the form of a rivet. A spring (not shown) is hooked with its first end on the mounting head 2 and with its second end on to the arm member 4 in order to ensure that the arm member 4 and thus the wiper blade connected thereto is pressed onto a windscreen to be wiped. In use, the shaft 3 rotates alternately in a clockwise and in a counter-clockwise sense carrying the mounting head 2 into rotation also, which in turn draws the arm member 4 into rotation and by means of the connecting device moves the wiper blade.

Figure 2:
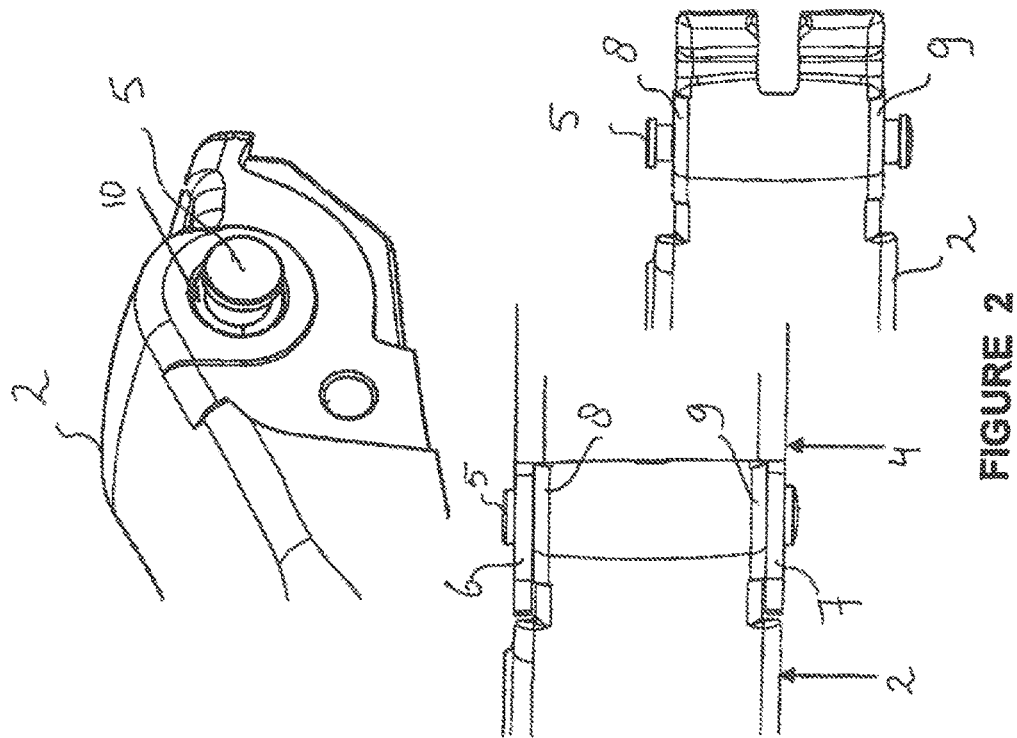

As illustrated, the arm member 4 has a substantially U-shaped cross-section near the pivot pin 5 comprising two side walls 6,7, wherein a part of the mounting head 2 extends between the side walls 6,7 and beyond the pivot pin 5. the part is provided with opposite surfaces 8,9 abutting against the side walls 6,7 in the prior art (FIGS. 2 and 4). However, in the present invention, the opposite surfaces 8,9 of the mounting head and the sidewalls 6,7 of the arm member are spaced-apart, i.e. placed at a distance D from each other. The distance D is particularly chosen between 0.1 mm and 1 mm. In assembled position of the mounting head 2 and the arm member 4, during a painting operation, paint is allowed to flow between the surfaces 8,9 of the mounting head 2 and the sidewalls 6,7 of the arm member 4. Reference is made to FIGS. 3 and 5.

FIGS. 4 and 5 correspond to FIGS. 2 and 3, respectively, wherein corresponding parts have been designated with the same reference numerals. As illustrated, the pivot pin 5 extends through the side walls 6,7 of the arm member 4 and through a transverse bush 10 of the mounting head 2. the transverse bush 10 extends through the surfaces 8,9 of the mounting head 2. As shown, the length of the transverse bush 10 is larger than the width of the mounting head 2, so as to allow paint to flow between each surface 8,9 of the mounting head 2 and its respective side wall 6,7 of the arm member 4. With reference to FIGS. 3 and 5, the length of the transverse bush 10 is slightly smaller than the width of the arm member 4, so as to limit lateral play of the mounting head 2 relative to the arm member 4.

Now referring to FIGS. 6 and 7, in a second and a third preferred embodiment according to the invention, a partly open ring is provided around the transverse bush 10 on the outside of each surface 8,9 of the mounting head 2. the partly open ring is formed by a part 11 of a ring having a closed circumference (FIG. 6) or by a ring 12 having interruptions 13 along its circumference. Hence, paint is allowed to enter between each surface 8,9 of the mounting head 2 and its respective side wall 6,7 of the arm member 4 either through a gap defined by the part 11 of the ring or through the interruptions 13 of the ring 12.

The invention is not restricted to the embodiments shown, but extends also to other embodiments falling within the scope of the appended claims.

The invention claimed is:

1. A windscreen wiper arm, comprising a mounting head mountable on a drive shaft and an arm member pivotally connected to the mounting head by means of a pivot pin, wherein the arm member has a substantially U-shaped cross-section near said pivot pin comprising two side walls, wherein a part of the mounting head extends between the side walls and beyond said pivot pin, and wherein said part is provided with opposite surfaces each facing towards a respective side wall of the arm member, wherein each surface of said part of said mounting head is positioned spaced-apart from its respective side wall of said arm member, so as to allow paint to enter a space defined between each surface of said part of said mounting head and its respective side wall of said arm member wherein said pivot pin extends through said side walls of said arm member and through a transverse bush of said mounting head said transverse bush being of one piece, and wherein said transverse bush extends through said surfaces of said part of said mounting head; and wherein a partly open ring is provided around said transverse bush on the outside of each surface of said part of said mounting head, so as to allow paint to enter the space defined between each surface of said part of said mounting head and its respective side wall of said arm member, wherein the length of said transverse bush is larger than the width of the mounting head at the location of said transverse bush, so as to allow paint to enter the space between each surface of said part of said mounting head and its respective side wall of said arm member, and wherein said ring is a separate piece from that of said bushing.

2. The windscreen wiper arm according to claim 1, wherein the distance between the one surface of said part of said mounting head and its respective side wall of said arm member equals the distance between the other surface of said part of said mounting head and its respective side wall of said arm member.

3. The windscreen wiper arm according to claim 1, wherein the distance between each surface of said part of said mounting head and its respective side wall of said arm member is lying within a range between 0.1 mm and 2 mm.

4. The windscreen wiper arm according to claim 3, wherein the distance is between 0.1 mm and 1 mm.

5. The windscreen wiper arm according to claim 1, wherein the length of said transverse bush is slightly smaller than the width of the arm member at the location of said transverse bush, so as to limit lateral play of said mounting head relative to said arm member.

6. The windscreen wiper arm according to claim 1, wherein said partly open ring is formed by a part of a ring having a closed circumference.

7. The windscreen wiper arm according to claim 1, wherein said partly open ring is formed by a ring having an interrupted circumference.

8. The windscreen wiper arm according to claim 1, wherein said pivot pin is a rivet.

9. The windscreen wiper arm according to claim 1, wherein the arm member is made of a metallic material.

10. A windscreen wiper arm comprising:
    a mounting head mountable on a drive shaft having opposite outer surfaces;
    an arm member having side walls that are laterally spaced and which straddle said outer surfaces of said mounting head;
    a bushing supported by said mounting head and providing an opening extending through said outer surfaces of said mounting head;
    a pivot pin received in said bushing and extending through corresponding apertures in said side walls of said arm member to couple said arm member pivotally to said mounting head;
    a pair of rings provided around the bushing on said outer side surfaces of said mounting head, said rings each having a split ring shape wherein there are opposing end faces of each ring that are circumferentially spaced from one another at their inner and outer radial edges, and wherein said rings are a separate structure from that of said bushing.

11. The windscreen wiper arm of claim 10, wherein said bushing is a split bushing having circumferential edges which abut along a seam.

* * * * *